United States Patent
Olsson (10) Patent No.: US 9,961,929 B2
(45) Date of Patent: May 8, 2018

(54) STEAM COOKING APPARATUS AND METHOD OF USE

(71) Applicant: Matthew K. Olsson, Pender, NE (US)

(72) Inventor: Matthew K. Olsson, Pender, NE (US)

(73) Assignee: Matthew K. Olsson, Pender, NE (US)

( * ) Notice: Subject to any disclaimer, the term of this patent is extended or adjusted under 35 U.S.C. 154(b) by 23 days.

(21) Appl. No.: 14/985,970

(22) Filed: Dec. 31, 2015

(65) Prior Publication Data

US 2017/0188742 A1     Jul. 6, 2017

(51) Int. Cl.
| | |
|---|---|
| *A23L 5/10* | (2016.01) |
| *A47J 27/04* | (2006.01) |
| *A47J 36/34* | (2006.01) |
| *A47J 27/13* | (2006.01) |
| *A47J 27/05* | (2006.01) |
| *A47J 36/20* | (2006.01) |

(52) U.S. Cl.
CPC ................. *A23L 5/13* (2016.08); *A47J 27/04* (2013.01); *A47J 27/05* (2013.01); *A47J 27/13* (2013.01); *A47J 36/20* (2013.01); *A47J 36/34* (2013.01); *A47J 2027/043* (2013.01)

(58) Field of Classification Search
CPC .. A23L 5/13; A47J 27/04–27/05; A47J 27/13; A47J 27/16–27/17; A47J 36/16–36/22; A47J 36/34
USPC .......................................... 426/523, 510–511
See application file for complete search history.

(56) References Cited

U.S. PATENT DOCUMENTS

| | | | | |
|---|---|---|---|---|
| 143,171 | A * | 9/1873 | Lundgren | A47J 27/04 126/369 |
| 831,746 | A * | 9/1906 | Rundell | A47J 27/04 126/369 |
| 1,330,868 | A * | 2/1920 | Harrison | A47J 36/00 220/23.87 |
| 1,547,762 | A * | 7/1925 | Kohlman, Jr. | A47J 27/05 126/369.1 |
| 1,750,596 | A * | 3/1930 | Hois | A47J 36/22 126/369 |
| 1,922,419 | A * | 8/1933 | Coulston | A47J 36/20 126/215 |
| 2,545,528 | A * | 3/1951 | Murray | A47G 19/08 220/574 |
| 3,289,571 | A * | 12/1966 | Lewus | A47J 27/04 126/369 |
| 3,372,694 | A * | 3/1968 | Vehse | A47J 27/10 126/369 |
| 3,808,963 | A * | 5/1974 | Ludena | A47J 27/04 99/339 |
| 4,117,948 | A * | 10/1978 | Collins | A47G 19/00 220/23.83 |
| 4,164,174 | A * | 8/1979 | Wallsten | A47J 27/04 220/23.87 |
| 4,373,511 | A * | 2/1983 | Miles | A47J 27/04 126/369 |
| 4,462,308 | A * | 7/1984 | Wang | A47J 27/04 126/369 |

(Continued)

Primary Examiner — Drew E Becker (57) ABSTRACT

The present invention provides an apparatus for the steaming heating of food. The apparatus is designed for placement within and onto an outer vessel. The apparatus including a steaming pedestal, bowl, bowl lid, steaming platform, lid, bowl plate, and under plate. The steaming platform including a plurality of venting/draining apertures and flange.

7 Claims, 7 Drawing Sheets

(56) References Cited

U.S. PATENT DOCUMENTS

| | | | | |
|---|---|---|---|---|
| 4,485,801 A | * | 12/1984 | Hodges | A47J 27/04 126/386.1 |
| 5,387,781 A | * | 2/1995 | Berkoff | A47J 27/04 219/733 |
| 5,794,525 A | * | 8/1998 | Fan | A47J 27/04 126/20 |
| 6,553,897 B2 | * | 4/2003 | Mach | A47J 27/06 99/339 |
| 2009/0095169 A1 | * | 4/2009 | York | A47J 27/004 99/448 |
| 2010/0163553 A1 | * | 7/2010 | Backaert | A47J 27/04 219/682 |
| 2011/0000380 A1 | * | 1/2011 | Jamison | A47J 27/05 99/417 |
| 2011/0083563 A1 | * | 4/2011 | Branson | A47J 27/04 99/410 |
| 2011/0271848 A1 | * | 11/2011 | Kuo | A47J 27/16 99/410 |

* cited by examiner

STEAM COOKING APPARATUS AND METHOD OF USE

CROSS REFERENCE TO RELATED APPLICATIONS

Not Applicable

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The present invention relates to a steaming apparatus and a method for its use.

BACKGROUND OF THE INVENTION

Currently there exists any number of ways to cook or reheat food. Often this heating process involves the use of a stove, oven, hotplate, or microwave oven. Typically, these processes utilize a dry heat to warm or heat the food to its desired temperature. One way to heat food is through the use of steam. Steam provides a gradual heating of the food and provides a heating environment that utilizes moisture. This moisture is absorbed by the reheated food and aids in its taste and texture. Several devices have been created to utilize steam for cooking. Many of these devices are separate or stand alone appliances. Still further, may of these systems utilize specific cookware and lack universal the capability for universal use. This lack of universal use and the requirement of a standalone unit or appliance are detrimental to the use of existing steam cooking devices.

Therefore, there is a need for a steam cooking apparatus that utilizes an existing main container and existing heat source to aid in the reheating of foods. Still further, it is desired that the device allow for the reheating of multiple foods and allows for the use of multiple segregated containers and cooking and serving devices.

SUMMARY OF THE INVENTION

A steam cooking apparatus and method of use is disclosed. The apparatus includes a steaming pedestal, bowl, bowl lid, bowl plate, steaming platform, under plate, and lid. The apparatus is designed for placement into an outer vessel that is placed onto a hot plate or stove. The outer vessel is preferably selected from an existing container already in the possession of the user. Preferably, this outer vessel is a standard container such as a stockpot. The steaming pedestal is sized for receipt within the outer vessel, includes a plurality of apertures, and provides a support surface for the bowl or a food item. The bowl is sized for receipt within the outer vessel and placement onto the steaming pedestal. The bowl lid is sized for receipt on the bowl and provides an enclosure for an interior of the bowl. The steaming platform is sized for receipt on a top of the outer vessel and is seated to enclose the outer vessel. The steaming platform includes vent/drain apertures to allow for the flow of liquid from the steaming platform to the interior of the vessel below the steaming platform. The vent/drain apertures are angled from an exterior of the platform the interior of the platform. The platform includes a flange, the flange adjacent to the angled apertures and extending around a circumference of the platform, interior to the apertures.

In use, the outer vessel is filled with a small amount of water and placed onto a heating source such as a stove or hotplate; the steam pedestal is placed into the outer vessel to support the bowl or stand-alone food item. If desired, food to be heated is placed within the bowl. The bowl may be used with or without the lid during heating. When the bowl is used without the lid during heating, food contents within the bowl will be heated quicker and more thoroughly. The steaming platform is placed on top of the outer vessel, wherein the steaming platform rests upon the top side of the outer vessel. Food for heating is placed upon the steaming platform. The lid is placed upon the steaming platform. As the water is heated within the outer vessel, steam will rise heating both the food below the platform and the food resting upon the steaming platform. The steaming platform apertures allow steam to travel from the within the outer vessel into the air space under the lid. As this steam condenses, the flange directs condensate to the apertures where the angled directionality of the apertures allows for the flow of condensate down to the interior of the outer vessel. This draining and flange and aperture configuration keeps food moist, but dry, and replenishes the water within the outer vessel. Additionally, as steam builds within the outer vessel it is channeled upward and through the apertures, wherein this movement emits a percolation with air blowing audibly against the lid. This sound is a good indicator that the steaming platform is functioning properly and that the food contents will be heated quickly and efficiently.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein.

DETAILED DESCRIPTION OF THE INVENTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Referring now to FIG. 1-FIG. 9, a steam cooking apparatus and method for use is described, the apparatus generally referred to as device 10. The steam cooking apparatus device 10 is designed for the heating or reheating of food in a moisture rich environment. The apparatus device 10 is designed for use with an existing large outer cooking vessel 2, such as a stockpot or saucepan. The apparatus device 10 can be used in its entirety or the various elements can be utilized separately.

Figure 1:
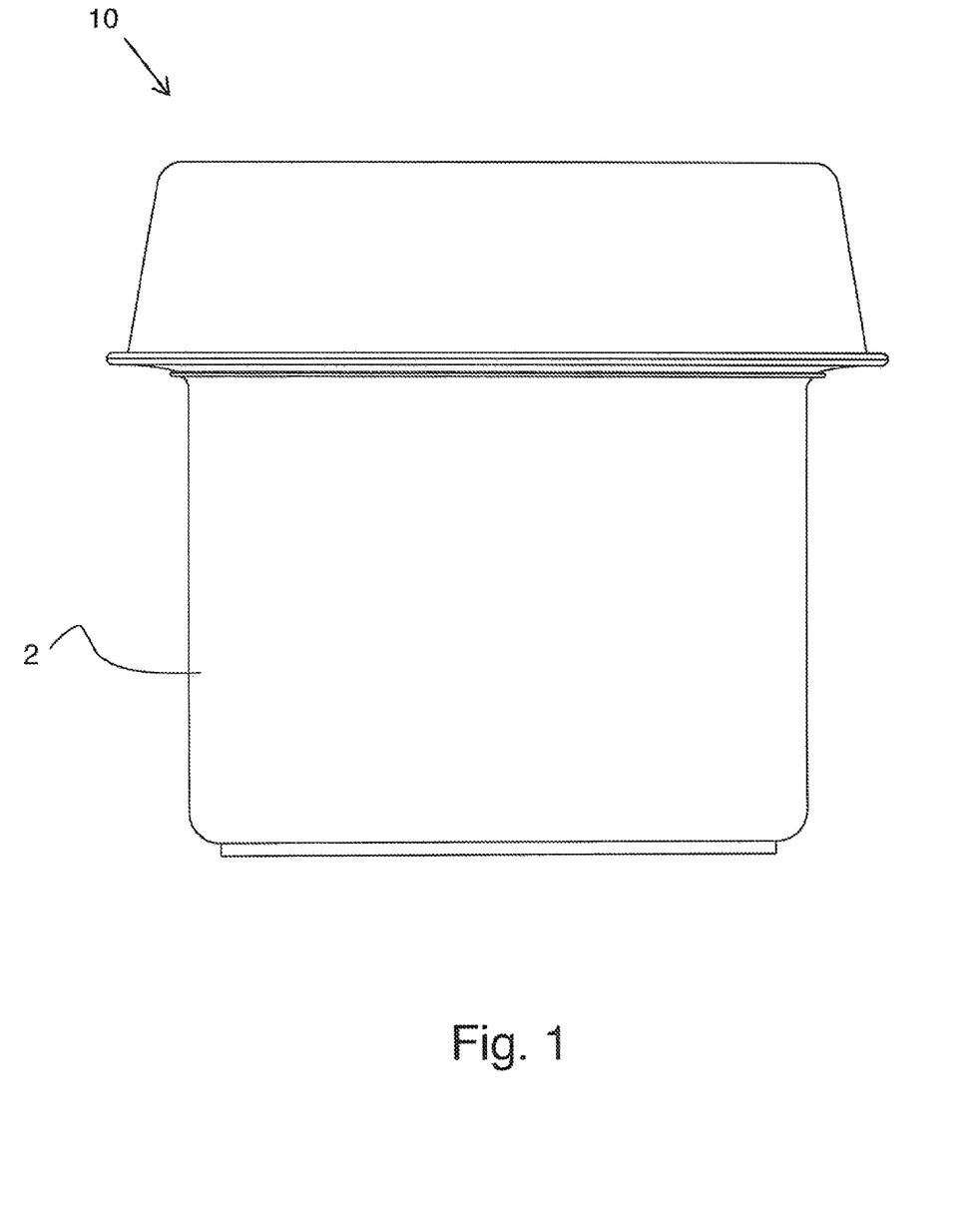
FIG. 1 is side view of the of exterior of the device including the outer vessel, according to the present invention.
Figure 2:
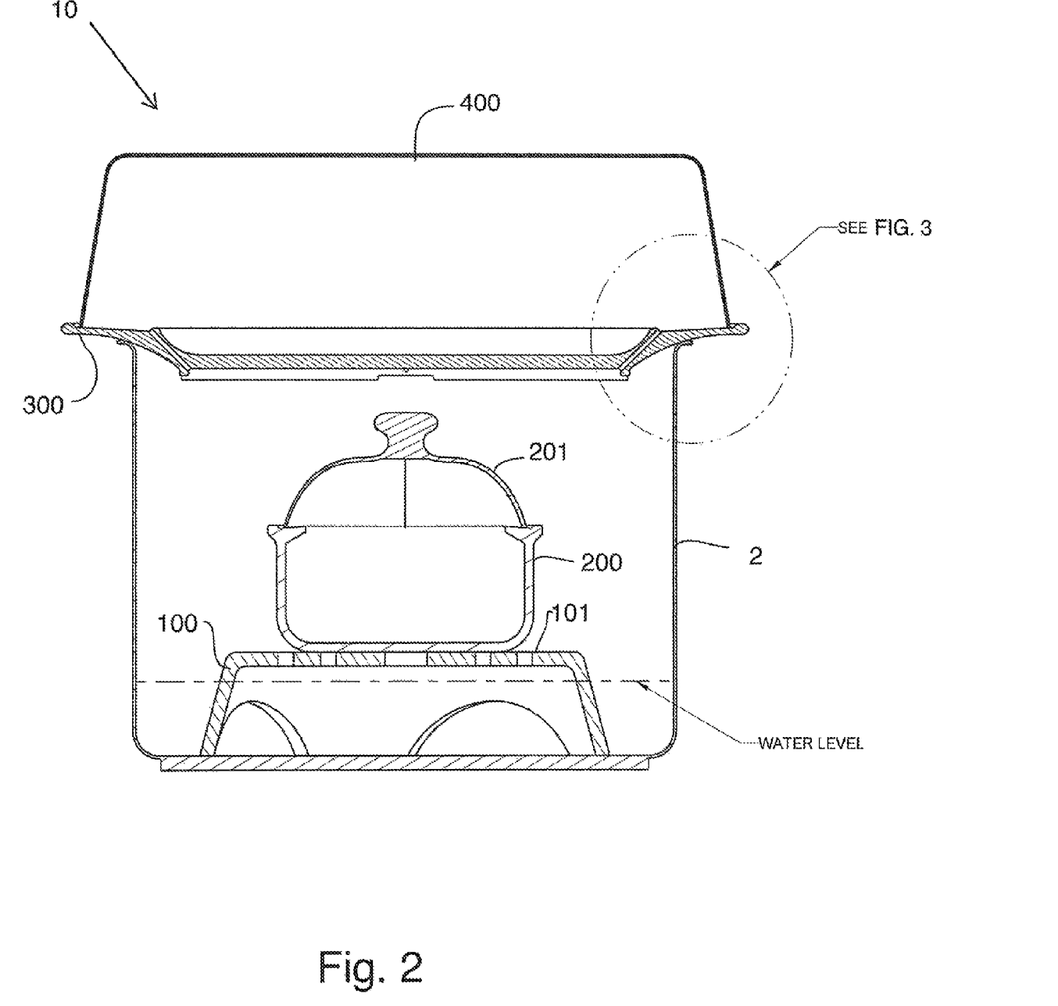
FIG. 2 is a cross-sectional view of the device, according to the present invention.

In use, the device 10 is placed within and on top of an outer vessel 2. The outer vessel 2 is primarily a stock pot, saucepan, or other similar large pot that defines an interior space for the placement of water, a top side defining a perimeter of the device, and a bottom side for placement on a hotplate or stove. The outer vessel 2 is anticipated to already be in the possession of the user, wherein the user is able to use the device of the present invention 10 without any additional purchases.

Figure 4:
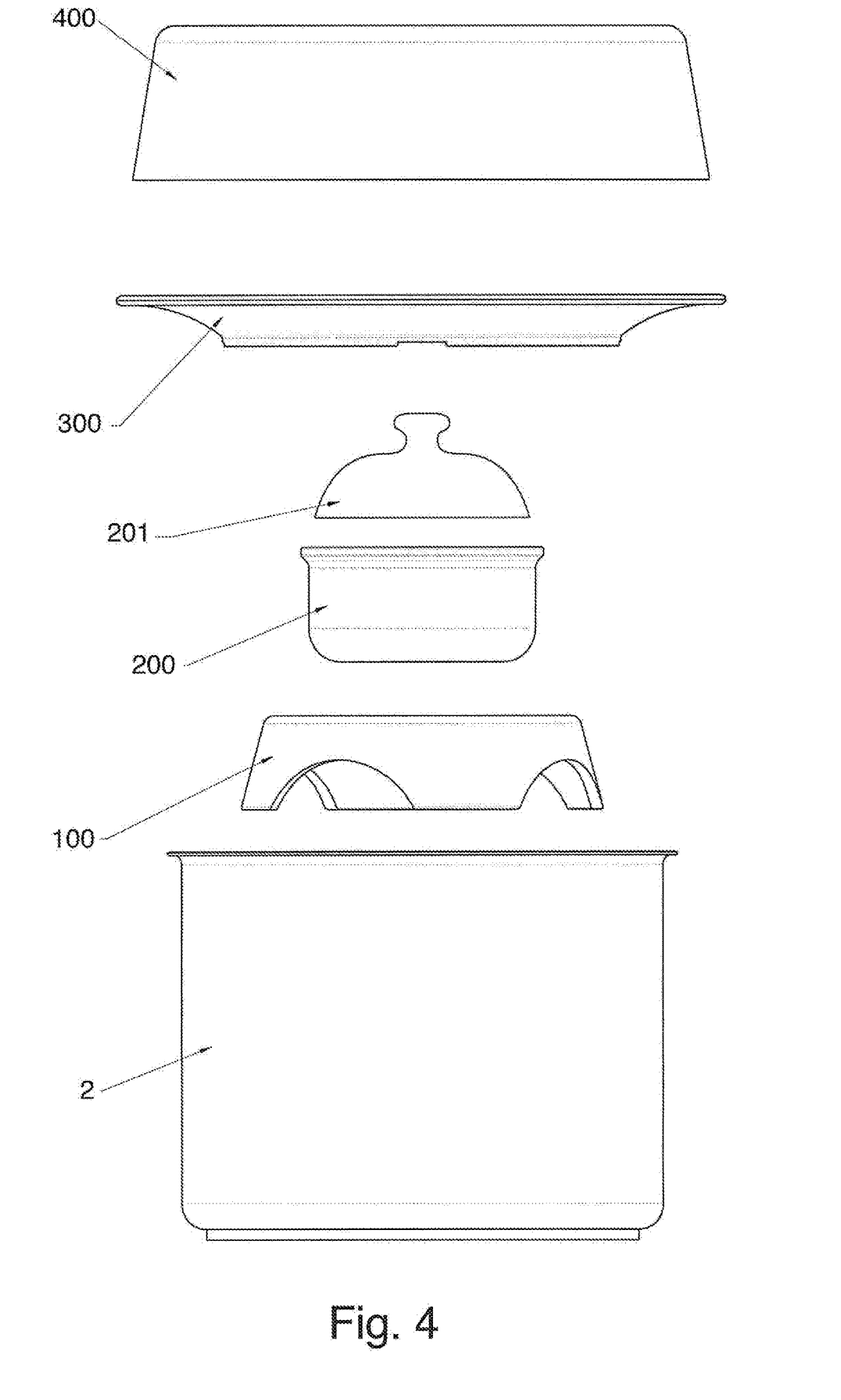
FIG. 4 is an exploded side view of device, according to the present invention.
Figure 5:
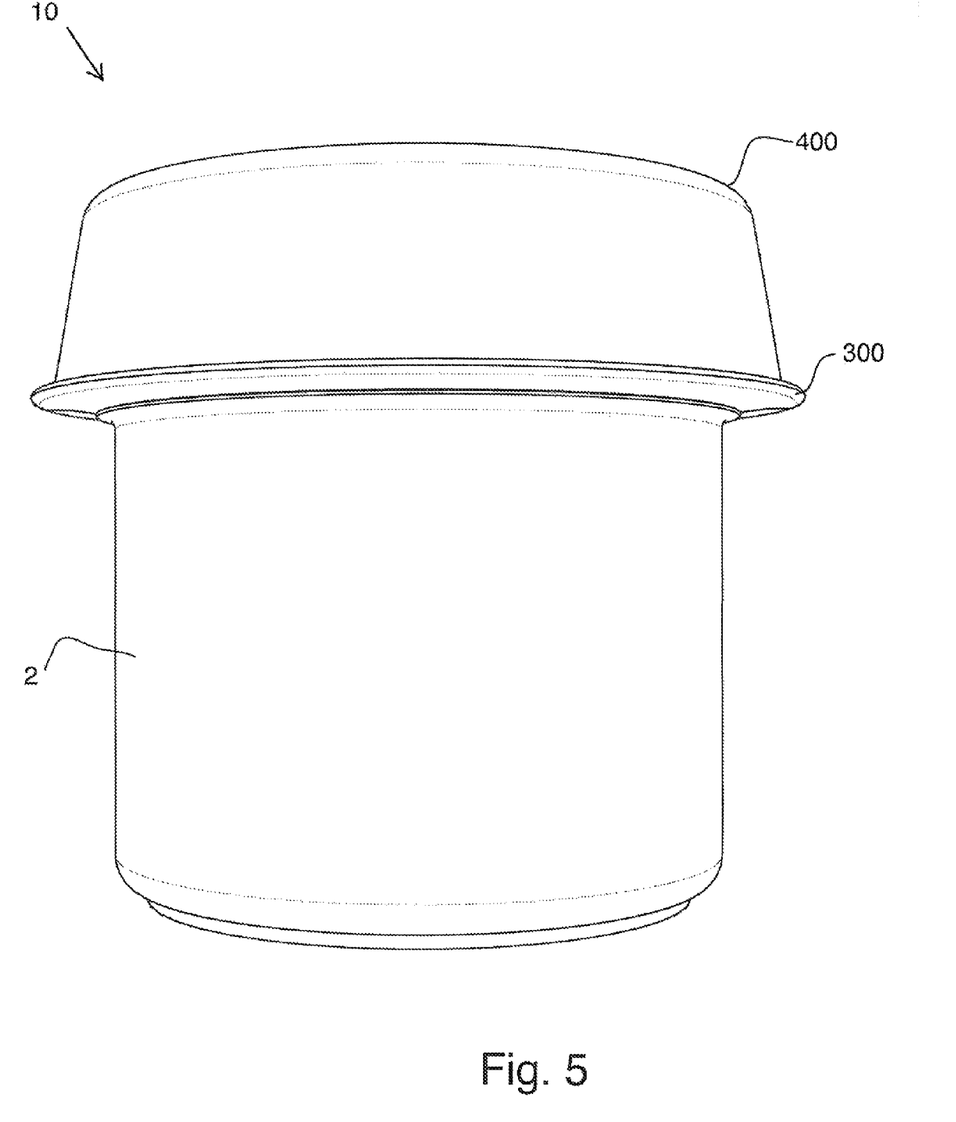
FIG. 5 is an isometric view of the device, according to the present invention.

The steam-cooking device 10 includes a steaming pedestal 100, bowl 200, bowl lid 201, bowl plate 210, steaming platform 300, under plate 330, and lid 400. The steaming pedestal 100 is sized for receipt within the outer vessel 2. The steaming pedestal 100 includes a top side 101 having a plurality of apertures 110 and legs 102. The legs 102 coupled to the top side 101 and extending a height, wherein the top side 101 is raised off of the bottom interior of the outer vessel 2. The top side 101 sized for resting support of the bowl 200 or a stand-alone food item and wherein the bowl 200 is seated upon the pedestal 100 during use. The plurality of apertures 110 allows for the flow of steam through the pedestal 100 and to the bowl 200.

Figure 6:
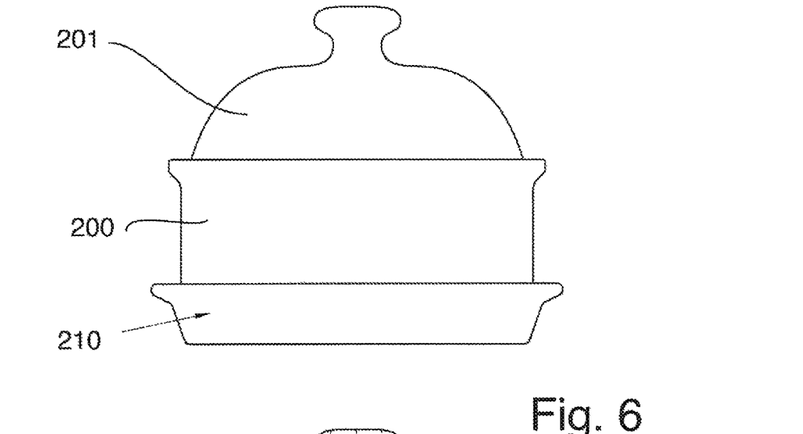
FIG. 6 is a side view of the bowl components of the device, according to the present invention.
Figure 7:
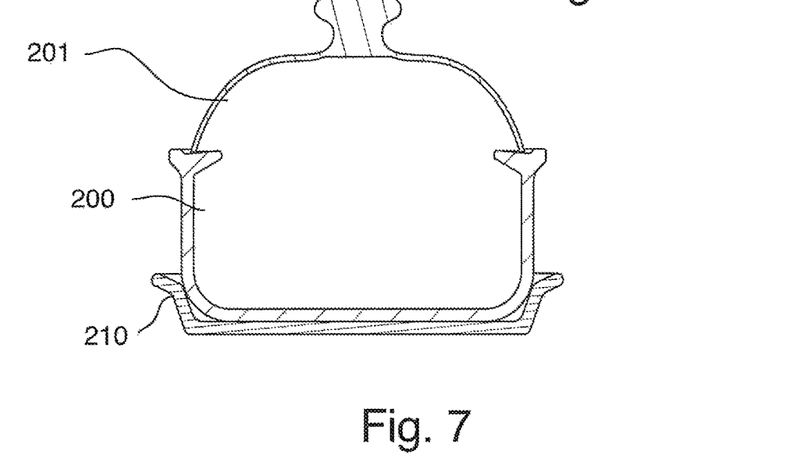
FIG. 7 is a cross-sectional view of the bowl components of the device, according to the present invention.

The bowl 200 defines an interior for the placement of a food item. The bowl 200 is closed with a bowl lid 201. The bowl lid 201 sized for placement on the bowl 200. A bowl plate 210 is sized for receipt of the bowl 200 and utilized for transport of the bowl 200 and resting support of the bowl 200 for the protection of a surface or a user when the bowl 200 is hot after use.

Figure 8:
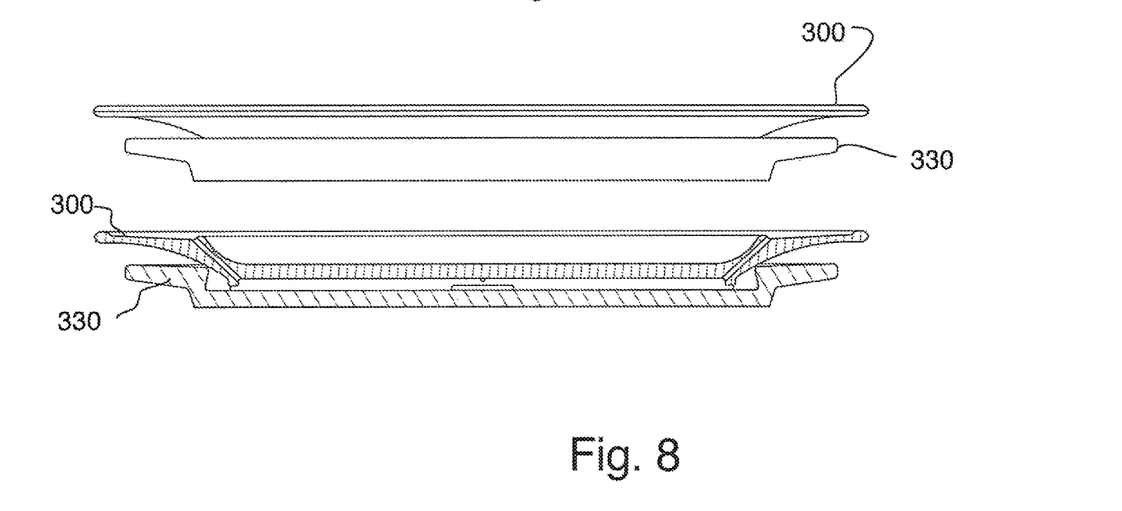
FIG. 8 is a side view and cross-sectional view of the steaming platform components of the device, according to the present invention.
Figure 9:
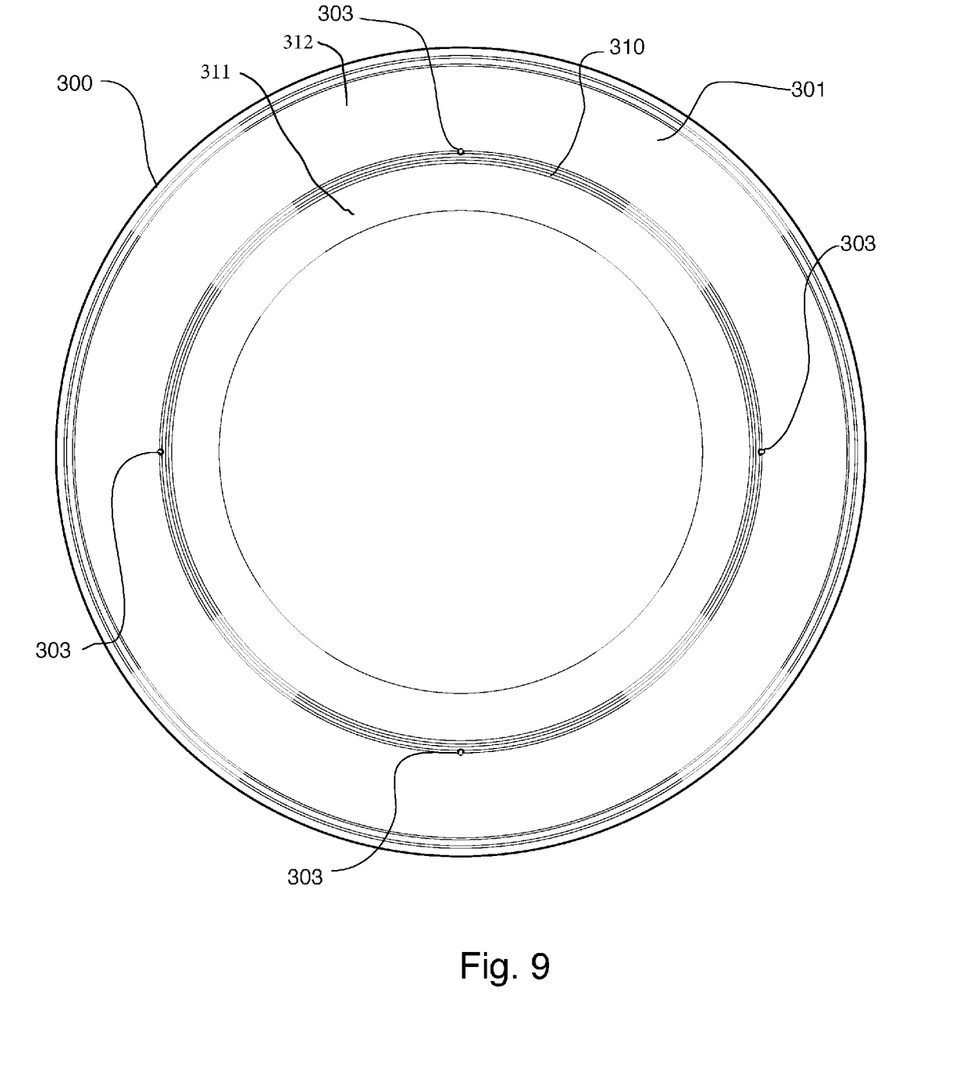
FIG. 9 is a top side view of the steaming platform of the device, according to the present invention.

The steaming platform 300 is generally planar and has a top side 301 and a bottom side 302 opposite the top side 301. The steaming platform 300 defines a perimeter, the perimeter sized larger than the top side opening of the outer vessel 2, wherein the steaming platform 300 is sized for resting support on the top side of the outer vessel 2. The steaming platform includes an interior area 311 and an exterior area 312, the exterior area 312 resting on the outer vessel 2 and the interior area 311 suspended above the outer vessel 2.

Figure 3:
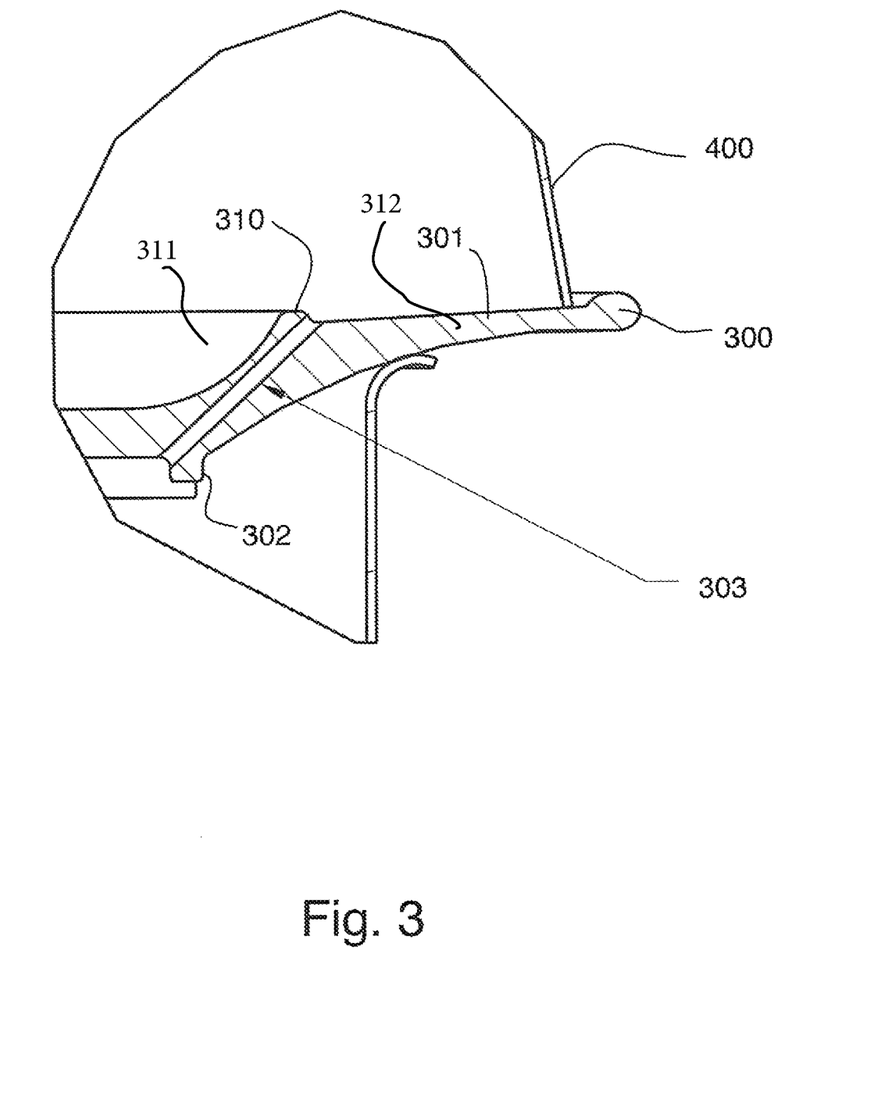
FIG. 3 is a magnified cross-sectional view of a section of the device as indicated in FIG. 2, according to the present invention.

Referring now specifically to FIG. 3, the steaming platform 300 includes a flange 310. The flange 310 has a height, the height extending opposite the bottom side 302 and separating the exterior area 312 and the interior area 311 of the steaming platform 300 around its entirety. A plurality of venting/draining apertures 303 are located along the perimeter of the steaming platform adjacent to an exterior side of the flange 310 within the exterior area 312. The venting/draining apertures 303 angled from the exterior area 312 of the top side 301 to the interior area 311 of the bottom side 302, wherein the venting/draining apertures allow for the transfer of steam from the interior of the outer vessel 2 and the evacuation of liquid condensate from the surface of the steaming platform 300 back into the interior of the outer vessel 2. The height of the flange 310 segregates the interior area 311 of the steaming platform 300 from the exterior area 312 of the steaming platform 300 keeping food contents away from puddled condensate and directing the condensate to the venting/draining apertures 303. An under plate 330 is sized for receipt of the steaming platform 300 and utilized for transport of the steaming platform 300 and resting support of the steaming platform 300 for the protection of a surface or a user when the steaming platform 300 is hot after use.

In the preferred embodiment of the present invention, four venting/draining apertures 303 are spaced equidistant around the perimeter of the steaming platform 300. Although four venting/draining apertures 303 are preferred it is anticipated that less apertures or more apertures spaced equidistant around the perimeter of the steaming platform 300 will also function appropriately to remove condensate.

The lid 400 is sized for placement on the steaming platform resting exterior to the flange 310 and the venting/draining aperture 303. The lid 400 enclosing the area above the steaming platform 300. The lid 400 may include a vent at a top side to allow for the rapid evacuation of steam.

In use, the outer vessel 2 is filled with a small amount of water and placed onto a heating source such as a stove or hotplate; the steam pedestal 100 is placed into the outer vessel 2 to support the bowl 200 or a stand-alone food item. Food to be heated is placed within the bowl 200 and, if desired, the lid 201 is placed onto the bowl. The steaming platform 300 is placed on top of the outer vessel 2, wherein the steaming platform 300 rests upon the top side of the outer vessel 2. Food for heating is placed upon the steaming platform 300 interior portion. The lid 400 is placed upon the steaming platform 300. As the water is heated within the outer vessel 2, steam will rise, heating both the food below beneath and upon the steaming platform 300. The steaming platform 300 venting/draining apertures 303 allow steam to travel up from the within the outer vessel 2 into the air space under the lid 400. As this steam condenses, the flange 310 directs condensate to the venting/draining apertures 303 where the angled directionality allows for the flow of condensate down to the interior of the outer vessel 2.

While the invention has been described above in terms of specific embodiments and elements, it is to be understood that the invention is not limited to these disclosed embodiments. Upon reading the teachings and viewing the drawings of this disclosure many modifications and other embodiments of the invention will come to mind of those skilled in the art to which this invention pertains, and which are intended to be and are covered by both this disclosure, the appended claims, and the applicable drawings. It is indeed intended that the scope of the invention should be determined by proper interpretation and construction of the appended claims and drawings and their legal equivalents, as understood by those of skill in the art relying upon the disclosure in this specification and the attached drawings.

The invention claimed is:

1. A steam cooking apparatus, the steam cooking apparatus including:
   an outer vessel, the outer vessel having a bottom side and a top side, the top side defining an opening of the vessel, the bottom side designed for placement on a heat source;
   a steaming pedestal, the steaming pedestal sized for placement within the outer vessel, the steaming pedestal having feet and a plurality of apertures;
   a bowl, the bowl sized for receipt within the outer vessel and placement onto the steaming pedestal, the bowl including a bowl lid;
   a steaming platform, the steaming platform sized for placement on the top side of the outer vessel for covering the outer vessel, the steaming platform including:
      a flange, the flange having a height extending from a top side of the steaming platform opposite a bottom side of the steaming platform, the flange extending around a perimeter of the steaming platform and segregating an interior area and an exterior area of the steaming platform; and
      a plurality of venting/draining apertures, the venting/draining apertures adjacent to an exterior side of the flange within the exterior area and extending from the top side of the steaming platform to the bottom side of the steaming platform, the venting/draining aperture angled from the top side of the exterior area to the bottom side of the interior area; and
   a lid, the lid sized for placement on the steaming platform.

2. A device as in claim 1, wherein the steaming platform includes at least four venting/draining apertures.

3. A device as in claim 1, wherein the apparatus includes a bowl plate and an under plate, the bowl plate sized for receipt of the bowl and adapted to support and transport the bowl, and the under plate sized for receipt of the steaming platform and adapted to support and transport the steaming platform.

4. A method of heating a food item utilizing an apparatus as in claim 3, the method utilizing an outer cooking vessel, the outer cooking vessel having an open top side defining an interior space, the outer cooking vessel having a bottom side, the bottom side designed for placement on a heating surface, the method comprising:
   placing water within the outer vessel;
   placing the steaming pedestal into the outer vessel;
   placing the bowl onto the steaming pedestal;
   placing the steaming platform onto the top of the outer vessel;
   placing the food item to be heated onto the steaming platform;
   placing the lid onto the steaming platform; and
   heating the outer vessel.

5. A steam cooking apparatus, the steam cooking apparatus designed for placement within an outer cooking vessel, the outer cooking vessel having an open top side defining an interior space, the outer cooking vessel having a bottom side, the bottom side designed for placement on a heating surface, the apparatus comprising:

a steaming pedestal, the steaming pedestal sized for placement within the outer vessel, the steaming pedestal having feet and a plurality of apertures;

a bowl, the bowl sized for receipt within the outer vessel and placement onto the steaming pedestal, the bowl including a bowl lid;

a steaming platform, the steaming platform sized for placement on the top side of the outer vessel to cover the outer vessel, the steaming platform including a flange, the flange having a height extending from a top side of the steaming platform opposite a bottom side of the steaming platform, the flange extending around a perimeter of the steaming platform and segregating an interior area from an exterior area of the steaming platform, the interior area aligned with the interior space and the exterior area positioned exterior to the interior space, the steaming platform including a plurality of venting/draining apertures, the venting/draining apertures adjacent to an exterior side of the flange and extending from the top side of the steaming platform to the bottom side of the steaming platform, the venting/draining apertures angled from the top side exterior area to the bottom side interior area; and a lid, the lid sized for placement on the steaming platform.

6. A device as in claim 5, wherein the steaming platform includes at least four venting/draining apertures.

7. A device as in claim 5, wherein the apparatus includes a bowl plate and an under plate, the bowl plate sized for receipt of the bowl and adapted to support and transport the bowl, and the under plate sized for receipt of the steaming platform and adapted to support and transport the steaming platform.

* * * * *